(12) United States Patent
Muneyasu et al.

(10) Patent No.: US 11,049,663 B2
(45) Date of Patent: Jun. 29, 2021

(54) ELECTROLYTIC CAPACITOR

(71) Applicant: Panasonic Intellectual Property Management Co., Ltd., Osaka (JP)

(72) Inventors: Kouta Muneyasu, Osaka (JP); Masahiro Sato, Kyoto (JP); Naomi Kurihara, Osaka (JP); Keita Uenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 76 days.

(21) Appl. No.: 16/503,657

(22) Filed: Jul. 5, 2019

(65) Prior Publication Data

US 2019/0333703 A1    Oct. 31, 2019

Related U.S. Application Data

(63) Continuation of application No. PCT/JP2017/043904, filed on Dec. 7, 2017.

(30) Foreign Application Priority Data

Jan. 31, 2017   (JP) .............................. JP2017-016300

(51) Int. Cl.
*H01G 9/045*   (2006.01)
*H01G 9/00*    (2006.01)
*H01G 9/025*   (2006.01)
*H01G 9/07*    (2006.01)
*H01G 9/08*    (2006.01)
(Continued)

(52) U.S. Cl.
CPC ............... *H01G 9/045* (2013.01); *H01G 2/08* (2013.01); *H01G 9/0003* (2013.01); *H01G 9/025* (2013.01); *H01G 9/07* (2013.01); *H01G 9/08* (2013.01); *H01G 9/15* (2013.01)

(58) Field of Classification Search
CPC ............................. H01G 9/08; H01G 9/0003
See application file for complete search history.

(56) References Cited

U.S. PATENT DOCUMENTS

2009/0059478 A1   3/2009  Umemoto et al.
2015/0049419 A1*  2/2015  Biler ...................... H01G 9/012
                                                        361/525

FOREIGN PATENT DOCUMENTS

| CN | 101383229 A | 3/2009 |
|---|---|---|
| JP | 59-117213 | 7/1984 |
| JP | 10-259292 | 9/1998 |

(Continued)

OTHER PUBLICATIONS

International Search Report of PCT application No. PCT/JP2017/043904 dated Feb. 27, 2018.

(Continued)

*Primary Examiner* — Eric W Thomas
(74) *Attorney, Agent, or Firm* — McDermott Will & Emery LLP

(57) ABSTRACT

An electrolytic capacitor includes a capacitor element, a lead member electrically connected to the capacitor element, an outer packaging member in which the capacitor element and a part of the lead member are sealed, and a heat barrier layer that covers at least a part of the outer packaging member. The heat barrier layer has an electrical insulation property, and contains at least one of metallic oxide and metal hydroxide.

11 Claims, 1 Drawing Sheet

(51) Int. Cl.
*H01G 9/15* (2006.01)
*H01G 2/08* (2006.01)

(56) References Cited

FOREIGN PATENT DOCUMENTS

| | | |
|---|---|---|
| JP | 2009-054906 | 3/2009 |
| JP | 2009-267026 | 11/2009 |

OTHER PUBLICATIONS

English Translation of Chinese Office Action dated Nov. 2, 2020 for the related Chinese Patent Application No. 201780084311.2.

\* cited by examiner

ELECTROLYTIC CAPACITOR

RELATED APPLICATIONS

This application is a continuation of the PCT International Application No. PCT/JP2017/043904 filed on Dec. 7, 2017, which claims the benefit of foreign priority of Japanese patent application No. 2017-016300 filed on Jan. 31, 2017, the contents all of which are incorporated herein by reference.

BACKGROUND

1. Technical Field

The present disclosure relates to an electrolytic capacitor including a capacitor element.

2. Description of the Related Art

An electrolytic capacitor includes a capacitor element, a lead member electrically connected to the capacitor element, and an outer packaging member in which the capacitor element and a part of the lead member are sealed.

When the electrolytic capacitor is exposed to a high temperature environment (for example, 250° C. or more) by a reflow treatment or the like, heat is transferred to the capacitor element disposed inside the electrolytic capacitor, and thus an electrical characteristic of the capacitor element may be degraded. Further, when the capacitor element contains a conductive polymer as a solid electrolyte, gas is generated due to thermal decomposition of the conductive polymer. In that case, an internal pressure of the electrolytic capacitor is increased with the generation of the gas, and thus a sealing property of the electrolytic capacitor may be degraded.

Unexamined Japanese Patent Publication No. 2009-267026 discloses a proposal that, in an electrochemical device including an electrochemical element and the film that seals the electrochemical element, an infrared reflecting layer is provided on a surface of the film. Consequently, the degradation of the electrochemical element due to thermal conduction to the electrochemical element in the electrochemical device is prevented. Metal such as aluminum or alloy containing aluminum is used as the infrared reflecting layer.

SUMMARY

According to a first aspect of the present disclosure, an electrolytic capacitor includes a capacitor element, a lead member electrically connected to the capacitor element, an outer packaging member in which the capacitor element and a part of the lead member are sealed, and a heat barrier layer that covers at least a part of the outer packaging member. The heat barrier layer has an electrical insulation property, and contains at least one of metallic oxide and metal hydroxide.

According to a second aspect of the present disclosure, an electrolytic capacitor includes a capacitor element, a lead member electrically connected to the capacitor element, and an outer packaging resin layer that covers the capacitor element and a part of the lead member. The outer packaging resin layer includes a porous particle having an electrical insulation property.

The present disclosure can provide the electrolytic capacitor having high reliability because the thermal conduction to the capacitor element disposed inside the electrolytic capacitor is suppressed.

DETAILED DESCRIPTION OF EMBODIMENT

Figure 1:
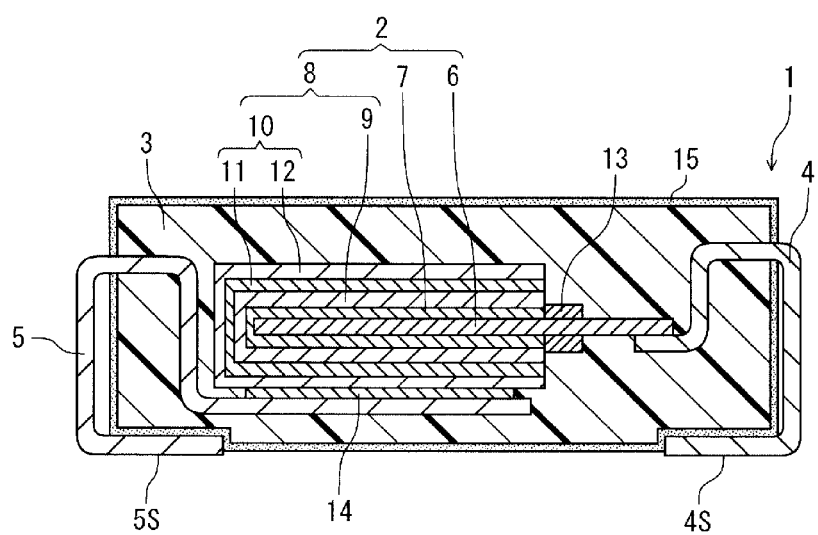
FIG. 1 is a sectional view schematically illustrating an example of an electrolytic capacitor according to the present disclosure.

Prior to the description of the exemplary embodiment, a problem of the conventional technique is explained. When a surface of the outer packaging member of the electrolytic capacitor is covered with the infrared reflecting layer having conductivity, the infrared reflecting layer and a lead member of the electrolytic capacitor may come into contact with each other to generate a short circuit, and reliability of the electrolytic capacitor may be degraded.

First Exemplary Embodiment

An electrolytic capacitor according to a first exemplary embodiment of the present disclosure includes a capacitor element, a lead member electrically connected to the capacitor element, an outer packaging member in which the capacitor element and a part of the lead member are sealed, and a heat barrier layer that covers at least a part of a surface of the outer packaging member.

The heat barrier layer contains a metallic compound exhibiting a heat barrier effect. At least one of metallic oxide and metal hydroxide can be used as the metallic compound exhibiting the heat barrier effect. By using the heat barrier layer, the thermal conduction to the capacitor element disposed inside the electrolytic capacitor is suppressed even if the electrolytic capacitor is exposed to a high temperature environment (for example, 250° C. or more) by a reflow treatment or the like. Degradation (degradation of an electrochemical characteristic) of the capacitor element due to the thermal conduction to the capacitor element is suppressed. When the capacitor element contains a conductive polymer as a solid electrolyte, generation of gas due to thermal decomposition of the conductive polymer is suppressed. Hence, degradation of a sealing property of the electrolytic capacitor due to an increase in internal pressure by the generation of the gas is suppressed.

The heat barrier layer has an electrical insulation property. Thus, even if the lead member and the heat barrier layer come into contact with each other, a short circuit is not occurred. Hence, the electrolytic capacitor having excellent reliability is obtained. Preferably, an oxide or a hydroxide contained in the heat barrier layer as the metallic compound also has the electrical insulation property.

Preferably, the outer packaging member is outer packaging resin layer (L1) that covers the capacitor element and a part of the lead member. The outer packaging member may include a bottomed case, which houses the capacitor element, and a sealing member, which closes an opening of the bottomed case. Examples of a material for the bottomed case include resin, metal, and ceramics. For example, the sealing member contains resin or a rubber component. A through-hole through which the lead member is inserted may be formed in the sealing member.

For example, the metallic oxide and/or the metal hydroxide used for the heat barrier layer contains aluminum, magnesium, silicon, zinc, nickel, titanium, zirconium, indium, tin, iron, copper, rhodium, niobium, tantalum, tungsten, and molybdenum. These materials may be used alone or at least two of these materials may be used in combination.

The heat barrier layer containing the metallic oxide is used as an infrared reflecting layer. The metallic oxide used for the heat barrier layer is preferably at least one selected from a group consisting of aluminum oxide, magnesium oxide, silicon oxide, titanium oxide, and zirconium oxide because these materials have high heat barrier effect. When the metallic oxide is hydrated, the heat barrier layer containing a hydrate of the metallic oxide is also used as a heat absorbing layer. Examples of the hydrate of the metallic oxide include Zeolite.

The heat barrier layer containing the metal hydroxide is used as the heat absorbing layer because the metal hydroxide generates water by the thermal decomposition. The metal hydroxide used for the heat barrier layer is preferably at least one of aluminum hydroxide and magnesium hydroxide because these materials have high heat barrier effect by the heat absorption.

Preferably, the heat barrier layer contains a metallic compound and resin. In this case, the metallic compound in a powder (particle) state can be contained in the heat barrier layer. For example, the heat barrier layer includes a resin layer and particles of the metallic compound dispersed in the resin layer. A shape of the particle may be porous or non-porous. The heat barrier layer (resin layer) preferably includes a cured product of a curable resin composition, and may include a thermoplastic resin or a composition containing the thermoplastic resin. As the curable resin composition and the thermoplastic resin (composition), those illustrated in the outer packaging resin layer (to be described later) can be used.

For example, the heat barrier layer can be formed by adding the metallic compound to the curable resin composition or the thermoplastic resin (composition) and then applying the resultant onto the surface of the outer packaging member (outer packaging resin layer).

The heat barrier layer covers at least a part of a surface of the outer packaging member. The heat barrier layer may cover an external surface (a surface at a side away from the capacitor element) of the outer packaging member or an internal surface (a surface at a side close to the capacitor element). However, when the heat barrier layer contains the metal hydroxide or the hydrate of the metallic oxide, which generates water by the thermal decomposition, the heat barrier layer preferably covers the external surface of the outer packaging member from the viewpoint of reliability of the electrolytic capacitor.

For example, a content proportion of the metallic compound in the heat barrier layer is greater than or equal to 20 wt %. Preferably, a thickness of the heat barrier layer ranges from 1 μm to 100 μm, inclusive. In this case, downsizing of the electrolytic capacitor can be achieved, and the thermal conduction into the electrolytic capacitor can sufficiently be suppressed.

Preferably, the metallic compound is in a form of porous particle. Here, "porous particle" referred in the specification includes a hollow particle. By using the porous particle, many voids are formed in the heat barrier layer. In addition to the heat barrier effect of the metallic compound, many voids formed in the heat barrier layer enhance the heat barrier effect. By using the heat barrier layer described above, the thermal conduction to the capacitor element in the electrolytic capacitor is suppressed even if the electrolytic capacitor is exposed to a high temperature environment (for example, 250° C. or more) by the reflow treatment or the like.

When the porous particle is used, the heat barrier layer can include more voids than outer packaging resin layer (L1). For example, a porosity of the heat barrier layer ranges from 20% to 80%, inclusive. From the viewpoint of securing the sealing property of the electrolytic capacitor, a porosity of outer packaging resin layer (L1) is less than 5%.

For example, the porosity of the heat barrier layer or outer packaging resin layer (L1) can be obtained by observing an image of a sectional portion of the heat barrier layer or outer packaging resin layer (L1) with a scanning electron microscope, and calculating a ratio of an area of a void to an area of the sectional portion.

For example, the porous particle is made of aluminum oxide, silicon oxide, or zeolite. For example, an average particle diameter of the porous particles ranges from 1 μm to 100 μm, inclusive. A BET specific surface area of the porous particle ranges from 10 $m^2/g$ to 1000 $m^2/g$, inclusive. For example, the content proportion of the porous particle in the heat barrier layer is greater than or equal to 20 wt %.

When a gap exists in a part of an interface between the lead member and outer packaging resin layer (L1), the heat barrier layer is preferably formed so as to fill the gap. In this case, the thermal conduction to the capacitor element in the electrolytic capacitor through the gap can be suppressed. Additionally, the sealing property of the electrolytic capacitor can further be enhanced.

From the viewpoint of enhancing a sealing effect of outer packaging resin layer (L1), outer packaging resin layer (L1) preferably includes a filler. In order to enhance the sealing property, the filler is preferably not porous, and for example, a spherical particle is used. On the other hand, in order to form many voids in the heat barrier layer, the porous particle in the heat barrier layer is preferably more porous than the filler. Preferably, the porous particle has the BET specific surface area larger than that of the filler. When the porous particle and the filler are made of a same material (for example, silicon oxide), the porous particle preferably has apparent density smaller than that of the filler.

From the viewpoint of thermal stability and mechanical strength, the filler is preferably a spherical silicon oxide particle. A decrease in adhesion between outer packaging resin layer (L1) and the lead member due to the degradation of outer packaging resin layer (L1) is suppressed when the electrolytic capacitor is exposed to a high temperature environment.

Second Exemplary Embodiment

An electrolytic capacitor according to a second exemplary embodiment includes a capacitor element, a lead member electrically connected to the capacitor element, and outer packaging resin layer (L2) that covers the capacitor element and a part of the lead member.

Outer packaging resin layer (L2) includes porous particles. Here, "porous particles" referred in the specification include hollow particles. High heat barrier effect is exhibited because many voids in outer packaging resin layer (L2) are formed by the porous particles. That is, outer packaging resin layer (L2) is also used as the heat barrier layer. Thus, the thermal conduction to the capacitor element in the electrolytic capacitor is suppressed even if the electrolytic capacitor is exposed to a high temperature environment (for example, 250° C. or more) by the reflow treatment or the like.

Each of the porous particles included in outer packaging resin layer (L2) has the electrical insulation property. Thus, even if the lead member and the porous particles included in outer packaging resin layer (L2) come into contact with each other, the short circuit is not occurred. Hence, the electrolytic capacitor having excellent reliability is obtained.

The porous particle of the first exemplary embodiment can be used as the porous particle included in outer packaging resin layer (L2). Preferably, the porous particle included in outer packaging resin layer (L2) is made of metallic oxide. In this case, high heat barrier effect is obtained without losing the sealing property. The metallic compound of the first exemplary embodiment can be used as the metallic oxide of the second exemplary embodiment. However, from the viewpoint of securing the sealing property, the metallic oxide contained in outer packaging resin layer (L2) is preferably not hydrated.

From the viewpoint of enhancing a sealing effect of outer packaging resin layer (L2), outer packaging resin layer (L2) preferably includes a filler. In order to enhance the sealing property, the filler is preferably not porous, and for example, a spherical particle is used. On the other hand, in order to form many voids in outer packaging resin layer (L2), the porous particle is preferably more porous than the filler. Preferably, the porous particle has the BET specific surface area larger than that of the filler. When the porous particle and the filler are made of a same material (for example, silicon oxide), the porous particle preferably has apparent density smaller than that of the filler.

From the viewpoint of the thermal stability and the mechanical strength, the filler is preferably a spherical silicon oxide particle. A decrease in adhesion between outer packaging resin layer (L2) and the lead member due to the degradation of outer packaging resin layer (L2) is suppressed when the electrolytic capacitor is exposed to a high temperature environment.

Preferably, outer packaging resin layer (L2) includes the filler. And a content ratio of the porous particle in outer packaging resin layer (L2) ranges from 20 parts by mass to 80 parts by mass, inclusive, with respect to a total of 100 parts by mass of the porous particle and the filler. In this case, the sealing effect of the filler and the heat barrier effect of the porous particle are obtained in a well-balanced manner in outer packaging resin layer (L2).

From the view points of the heat barrier effect and the sealing property of the electrolytic capacitor, a porosity of outer packaging resin layer (L2) including porous particle ranges from 20% to 80%, inclusive. For example, when outer packaging resin layer (L2) includes the filler, the sealing property of the electrolytic capacitor can sufficiently be secured even if outer packaging resin layer (L2) including the porous particle ranges from 20% to 80%, inclusive. For example, the content proportion of the porous particle in outer packaging resin layer (L2) ranges from 50 wt % to 95 wt %, inclusive.

Outer Packaging Resin Layer

In both of the first and second exemplary embodiments, the outer packaging resin layer preferably includes a cured product of a curable resin composition and may contain a thermoplastic resin or a composition containing the thermoplastic resin. As the curable resin composition and the thermoplastic resin (composition), those illustrated below can be used.

The outer packaging resin layer can be formed by a molding technique such as injection molding, insert molding, or compression molding. The outer packaging resin layer can be formed by filling a predetermined portion with the curable resin composition or the thermoplastic resin (composition) using a predetermined mold so as to cover a part of a lead together with an external surface of the capacitor element. When the outer packaging resin layer is also used as the heat barrier layer as in the second exemplary embodiment, the above-mentioned porous particle may be added to the curable resin composition or the thermoplastic resin (composition).

The curable resin composition may contain the filler, a curing agent, a polymerization initiator, and/or a catalyst in addition to the curable resin. Examples of the curable resin include a photo-curable resin and a thermosetting resin. The curing agent, the polymerization initiator, the catalyst, or the like is appropriately selected depending on a type of curable resin.

For example, a compound (such as a monomer, an oligomer, or a prepolymer) cured or polymerized by an effect of heat is used as the curable resin. Examples of the compounds (or curable resins) include an epoxy resin, a phenolic resin, a urea resin, polyimide, polyamide-imide, polyurethane, diallyl phthalate, and unsaturated polyester. The curable resin composition may contain a plurality of curable resins.

For example, an insulating particle (an inorganic particle, an organic particle) and/or fiber is preferably used as the filler. Examples of the insulating material constituting the filler include an insulating compound such as silicon oxide and aluminum oxide, glass, and a mineral material (for example, talc, mica, or clay). The outer packaging resin layer may contain one kind or at least two kinds of these fillers. For example, the content proportion of the filler in the outer packaging resin layer ranges from 10 wt % to 90 wt %, inclusive.

Examples of the thermoplastic resin include polyphenylene-sulfide (PPS) and polybutylenetelephthalate (PBT). The composition containing the thermoplastic resin may contain the filler and the like in addition to the thermoplastic resin.

(Capacitor Element)

When the outer packaging member is the outer packaging resin layer, for example, a laminated-type capacitor element is used as the electrolytic capacitor. For example, the laminated-type capacitor element includes an anode body, a dielectric layer covering the anode body, and a cathode part covering the dielectric layer. The cathode part includes a solid electrolyte layer covering the dielectric layer and a cathode lead-out layer covering the solid electrolyte layer.

When the outer packaging member includes a bottomed case and a sealing member that closes an opening of the bottomed case, for example, the capacitor element in which an anode body (aluminum foil) including the dielectric layer on the surface and a cathode body (aluminum foil) are wound with a separator interposed between the anode body and the cathode body is used as the electrolytic capacitor. The winding-type capacitor element includes an electrolytic solution and/or a solid electrolyte. The winding-type electrolytic capacitor further includes a mold resin layer covering the sealing member in order to enhance the sealing property.

(Lead Member)

When the laminated-type capacitor element is used, for example, a lead frame is used as the lead member. When the winding-type capacitor element is used, the lead member includes a lead tab connected to the capacitor element and a lead wire connected to an end of the lead tab. The lead wire pierces the sealing member.

FIG. 1 is a sectional view schematically illustrating an example of the electrolytic capacitor according to the present disclosure.

As illustrated in FIG. 1, electrolytic capacitor 1 includes capacitor element 2, anode terminal 4 (anode-side lead member) and cathode terminal 5 (cathode-side lead member) that are electrically connected to capacitor element 2, and outer packaging resin layer 3 that covers capacitor element 2 and parts of anode terminal 4 and cathode terminal 5. The parts of anode terminal 4 and cathode terminal 5 are exposed to an outside of outer packaging resin layer 3. Outer packaging resin layer 3 has a substantially rectangular parallelepiped outer shape, and electrolytic capacitor 1 also has a substantially rectangular parallelepiped outer shape. The lead frame is used as anode terminal 4 and cathode terminal 5. For example, copper or a copper alloy is used as a material for the lead frame.

Electrolytic capacitor 1 includes heat barrier layer 15 that has an electrical insulation property and covers the surface of outer packaging resin layer 3. Heat barrier layer 15 includes the metallic compound of the first exemplary embodiment. The metallic compound preferably forms the porous particle. In the case where a gap exists in a part of an interface between outer packaging resin layer 3 and anode terminal 4 and/or cathode terminal 5, heat barrier layer (not illustrated) is preferably formed so as to fill the gap. Instead of providing heat barrier layer 15, outer packaging resin layer 3 is also used as the heat barrier layer as described in the second exemplary embodiment.

Main surface 4S of anode terminal 4 and main surface 5S of cathode terminal 5 are exposed from a same surface of outer packaging resin layer 3. The exposure surface is used for soldering connection with a substrate (not shown) on which electrolytic capacitor 1 is to be mounted.

Capacitor element 2 includes anode body 6, dielectric layer 7 that covers anode body 6, and cathode part 8 that covers dielectric layer 7. Cathode part 8 includes solid electrolyte layer 9 that covers dielectric layer 7 and cathode lead-out layer 10 that covers solid electrolyte layer 9. Cathode lead-out layer 10 includes carbon layer 11 and silver paste layer 12.

Anode body 6 includes an area opposed to cathode part 8 and an area that is not opposed to cathode part 8. On a part adjacent to cathode part 8 in the area that is not opposed to cathode part 8, insulating separation layer 13 is formed so as to zonally cover the surface of anode body 6, thereby regulating contact between cathode part 8 and anode body 6. Another part in the area that is not opposed to cathode part 8 is electrically connected to anode terminal 4 by welding. Cathode terminal 5 is electrically connected to cathode part 8 through adhesive layer 14 made of a conductive adhesive.

Anode body 6 may include a valve metal, an alloy containing the valve metal, and a compound containing the valve metal. These materials may be used alone or at least two of these materials may be used in combination. As the valve metal, for example, aluminum, tantalum, niobium, or titanium are preferably used. Anode body 6 has a porous surface. For example, anode body 6 can be obtained by roughening the surface of a base material (such as a foil-shaped or plate-shaped base material) including the valve metal by etching.

A sintered body (porous body) including the valve metal may be used as the anode body. When the sintered body is used, one end of the lead member at a side close to the anode is embedded in the sintered body. For example, powders including the valve metal are pressurized to be molded while one end in a longitudinal direction of an anode lead is embedded in the powders, and a molded body having a desired shape (for example, a block shape) is obtained. After that, the molded body is sintered to obtain the sintered body.

Dielectric layer 7 includes oxide (for example, aluminum oxide) of the valve metal. Dielectric layer 7 is formed along a porous surface (including an inner wall surfaces of a hole) of anode body 6. A surface of dielectric layer 7 has an irregular shape corresponding to a shape of the surface of anode body 6. Solid electrolyte layer 9 is preferably formed so as to fill such irregularities of dielectric layer 7.

For example, dielectric layer 7 is formed by anodizing the surface of the anode body through an anodizing treatment. The anodization can be performed by a known method such as the anodizing treatment. For example, the anodizing treatment is performed by immersing the anode body in an anodizing solution to impregnate the surface of the anode body with the anodizing solution, and applying voltage between the anode body as an anode and a cathode immersed in the anodizing solution. For example, a phosphoric acid aqueous solution is preferably used as the anodizing solution.

For example, solid electrolyte layer 9 contains a manganese compound or a conductive polymer. For example, polypyrrole, polythiophene, polyaniline, and derivatives of polypyrrole, polythiophene, and polyaniline can be used as the conductive polymer. Solid electrolyte layer 9 may contain a dopant. More specifically, solid electrolyte layer 9 contains poly (3,4-ethylenedioxythiophene) (PEDOT) as a conductive polymer and polystyrene sulfonic acid (PSS) as a dopant.

For example, solid electrolyte layer 9 may be formed through chemical polymerization and/or electrolytic polymerization of raw material monomer on a dielectric layer. For example, a treatment liquid containing a conductive polymer may be caused to adhere to dielectric layer 7, and dried to form solid electrolyte layer 9. The treatment liquid may further contain other components such as a dopant. The treatment liquid is a dispersion liquid or a solution of the conductive polymer. Examples of a dispersion medium (solvent) include water, an organic solvent, and a mixture of water and an organic solvent.

Carbon layer 11 is only required to have conductivity. For example, carbon layer 11 is formed by using a conductive carbon material such as graphite. For example, silver paste layer 12 is formed by using a composition containing a silver powder and a binder resin (such as an epoxy resin). Cathode lead-out layer 10 is obtained by sequentially forming carbon layer 11 and silver paste layer 12.

The electrolytic capacitor of the present disclosure is not limited to the electrolytic capacitor having the structure in FIG. 1, but can be applied to electrolytic capacitors having various structures. For example, the present disclosure can also be applied to an electrolytic capacitor in which the sintered body (porous body) containing the valve metal is used as the anode body.

Even if the electrolytic capacitor of the present disclosure is exposed to a high temperature environment, the electrolytic capacitor of the present disclosure can be used for various applications requiring high reliability.

What is claimed is:

1. An electrolytic capacitor comprising:
   a capacitor element;
   a lead member electrically connected to the capacitor element;

an outer packaging member in which the capacitor element and a part of the lead member are sealed; and a heat barrier layer that covers at least a part of a surface of the outer packaging member, the heat barrier layer having an electrical insulation property, wherein:

the heat barrier layer contains at least one of metallic oxide or metal hydroxide, the metallic oxide is at least one selected from a group consisting of aluminum oxide, magnesium oxide, titanium oxide, and zirconium oxide, the metallic oxide does not include a hydrate of metallic oxide, and the at least one of metallic oxide or metal hydroxide is in a form of porous particle.

2. The electrolytic capacitor according to claim 1, wherein:

the heat barrier layer contains the metal hydroxide, and the metal hydroxide is at least one of magnesium hydroxide and aluminum hydroxide.

3. The electrolytic capacitor according to claim 1, wherein the heat barrier layer further contains resin.

4. The electrolytic capacitor according to claim 1, wherein:

the outer packaging member is an outer packaging resin layer that covers the capacitor element and the part of the lead member, the outer packaging resin layer includes a filler, and the porous particle of the at least one of metallic oxide and metal hydroxide is more porous than the filler.

5. The electrolytic capacitor according to claim 1, wherein a thickness of the heat barrier layer ranges from 1 μm to 100 μm, inclusive.

6. The electrolytic capacitor according to claim 1, wherein:

the capacitor element includes a solid electrolyte, and the solid electrolyte includes a conductive polymer.

7. An electrolytic capacitor comprising:

a capacitor element;

a lead member electrically connected to the capacitor element; and an outer packaging resin layer that covers the capacitor element and a part of the lead member, wherein:

the outer packaging resin layer includes a porous particle having an electrical insulation property, the porous particle includes at least one of metallic oxide or metal hydroxide, the metallic oxide is at least one selected from a group consisting of aluminum oxide, magnesium oxide, titanium oxide, and zirconium oxide, and the metallic oxide does not include a hydrate of metallic oxide.

8. The electrolytic capacitor according to claim 7, wherein:

the outer packaging resin layer includes filler, and the porous particle is more porous than the filler.

9. The electrolytic capacitor according to claim 8, wherein a content ratio of the porous particle in the outer packaging resin layer ranges from 20 parts by mass to 80 parts by mass, inclusive, with respect to a total of 100 parts by mass of the porous particle and the filler.

10. The electrolytic capacitor according to claim 7, wherein the porous particle includes metallic oxide.

11. The electrolytic capacitor according to claim 7, wherein:

the capacitor element includes a solid electrolyte, and the solid electrolyte includes a conductive polymer.

* * * * *